(12) United States Patent
Lowell et al.

(10) Patent No.: US 8,929,701 B2
(45) Date of Patent: Jan. 6, 2015

(54) LOOSE-TUBE OPTICAL-FIBER CABLE

(71) Applicant: Draka Comteq, B.V., Amsterdam (NL)

(72) Inventors: Mark Edmund Lowell, Berkley, MA (US); Tyler Louis Angers, Barrington, RI (US); Jan Wigger Jonker, Appingedam (NL)

(73) Assignee: Draka Comteq, B.V., Amsterdam (NL)

(*) Notice: Subject to any disclaimer, the term of this patent is extended or adjusted under 35 U.S.C. 154(b) by 143 days.

(21) Appl. No.: 13/768,280

(22) Filed: Feb. 15, 2013

(65) Prior Publication Data

US 2013/0209044 A1 Aug. 15, 2013

Related U.S. Application Data

(60) Provisional application No. 61/599,184, filed on Feb. 15, 2012, provisional application No. 61/678,300, filed on Aug. 1, 2012.

(51) Int. Cl.
*G02B 6/44* (2006.01)
*G02B 6/00* (2006.01)

(52) U.S. Cl.
CPC ............ *G02B 6/4436* (2013.01); *G02B 6/443* (2013.01)
USPC .......................................... 385/101; 385/147

(58) Field of Classification Search
USPC ........................... 385/100, 10, 102, 108, 109
See application file for complete search history.

(56) References Cited

U.S. PATENT DOCUMENTS

| | | |
|---|---|---|
| 4,232,935 A | 11/1980 | Rohner et al. |
| 4,838,643 A | 6/1989 | Hodges et al. |
| 5,493,626 A | 2/1996 | Schultz et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,151,434 A | 11/2000 | Bonicel |
| 6,175,677 B1 | 1/2001 | Yang et al. |
| 6,181,857 B1 | 1/2001 | Emeterio et al. |
| 6,201,917 B1 | 3/2001 | Campion et al. |
| 6,210,802 B1 | 4/2001 | Risch et al. |
| 6,215,931 B1 | 4/2001 | Risch et al. |

(Continued)

FOREIGN PATENT DOCUMENTS

| | | |
|---|---|---|
| EP | 0022036 A1 | 1/1981 |
| EP | 1921478 A1 | 5/2008 |

(Continued)

OTHER PUBLICATIONS

Draka, product specification sheet "DrakaElite Graded-Index Multimode Optical Sensor Fiber", Dec. 2009, pp. 1-2.

(Continued)

*Primary Examiner* — Akm Enayet Ullah
(74) *Attorney, Agent, or Firm* — Additon, Higgins & Pendleton, P.A.

(57) ABSTRACT

The present invention relates to loose-tube optical-fiber cables that are capable of operating in high-temperature environments.

20 Claims, 8 Drawing Sheets

(56) References Cited

U.S. PATENT DOCUMENTS

| | | |
|---|---|---|
| 6,229,944 B1 | 5/2001 | Yokokawa et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,463,199 B1 | 10/2002 | Quinn et al. |
| 6,493,491 B1 | 12/2002 | Shen et al. |
| 6,597,850 B2 | 7/2003 | Andrieu et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,704,485 B1 | 3/2004 | Campion et al. |
| 6,749,446 B2 | 6/2004 | Nechitailo |
| 6,754,423 B2 | 6/2004 | Simons et al. |
| 6,853,798 B1 | 2/2005 | Weiss |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,471,861 B2 | 12/2008 | Schneider et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,630,611 B2 | 12/2009 | Simons et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,145,025 B2 | 3/2012 | de Montmorillon et al. |
| 8,145,026 B2 | 3/2012 | Overton et al. |
| 8,165,439 B2 | 4/2012 | Overton |
| 8,195,018 B2 | 6/2012 | Overton et al. |
| 8,682,123 B2 * | 3/2014 | Parris ............................ 385/100 |
| 2003/0031441 A1 | 2/2003 | Simons et al. |
| 2004/0099015 A1 | 5/2004 | Leppert |
| 2007/0058913 A1 | 3/2007 | Knoch et al. |
| 2007/0098359 A1 * | 5/2007 | Ando et al. ..................... 386/79 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0279835 A1 * | 11/2009 | De Montmorillon et al. 385/127 |
| 2009/0297107 A1 | 12/2009 | Tatat |
| 2010/0021170 A1 | 1/2010 | Lumineau et al. |
| 2010/0092135 A1 | 4/2010 | Barker et al. |
| 2010/0092140 A1 * | 4/2010 | Overton ......................... 385/112 |
| 2010/0118388 A1 | 5/2010 | Pastouret et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 * | 6/2010 | Testu et al. ..................... 385/109 |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0310218 A1 | 12/2010 | Molin et al. |
| 2011/0026889 A1 * | 2/2011 | Risch et al. ..................... 385/102 |
| 2011/0044595 A1 * | 2/2011 | Sillard et al. ................... 385/124 |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 * | 7/2011 | Parris ............................ 385/113 |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0039361 A1 | 2/2012 | Gooijer et al. |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1 | 10/2012 | Molin et al. |
| 2012/0275751 A1 | 11/2012 | Krabshuis et al. |
| 2012/0301093 A1 | 11/2012 | Sillard et al. |
| 2012/0315006 A1 | 12/2012 | Sillard et al. |
| 2013/0004135 A1 | 1/2013 | Bigot-Astruc et al. |

FOREIGN PATENT DOCUMENTS

| | | |
|---|---|---|
| GB | 2331160 A | 5/1999 |
| WO | 2009/062131 A1 | 5/2009 |
| WO | 2010/068196 A1 | 6/2010 |

OTHER PUBLICATIONS

Cotronics, product specification sheet "Duraseal Non-Sag Putties", www.cotronics.com (no date) pp. 1 [Appendix 2 in U.S. Appl. No. 61/678,300].

Loctite, product specification sheet "Silicomet JS533", (no date) pp. 1.

Henkel, Technical Data Sheet for "Loctitie 5398", Nov. 2004, pp. 1-2.

Lahijani et al., "A New Class of Perfluoropolymers: High-Temperature Expitaxial Co-Crystalline (ECC) Perfluoropolymer Resins", DuPont Chemicals and Fluoroproducts, Wilmington, DE, (2011) pp. 1-4.

Draka, product specification sheet "BendBright Single-Mode Optical Fiber", Aug. 2010, pp. 1-2.

Draka, product specification sheet "Enhanced Single-Mode Optical Fiber (ESMF)", Aug. 2010, pp. 1-2.

Verrillon, product specification sheet "Single Mode Fiber, Pure Core, Cargon-Polyimide", Jun. 24, 2004, pp. 1 [Appendix 7 in U.S. Appl. No. 61/678,300].

(56) References Cited

OTHER PUBLICATIONS

ISO 6892 Determination of tensile properties, Mar. 1, 2001, pp. 1-2.
Henkel, product specification sheet "Locitite 5398" (Nov. 2004) pp. 1-7 [Appendix 3 in U.S. Appl. No. 61/678,300].
Henkel, product specification sheet "Silicomet 100 GR JS533" (Nov. 2009) pp. 1-5 [Appendix 4 in U.S. Appl. No. 61/678,300].
Lowell, U.S. Appl. No. 61/599,184, filed Feb. 15, 2012, pp. 1-71.
Lowell, U.S. Appl. No. 61/678,300, filed Aug. 1, 2012, pp. 1-74.
Bigot-Astruc et al., U.S. Appl. No. 61/503,773, filed Jul. 1, 2011, pp. 1-77.
Molin, U.S. Appl. No. 61/539,346, filed Sep. 26, 2011, pp. 1-142.

* cited by examiner

LOOSE-TUBE OPTICAL-FIBER CABLE

CROSS-REFERENCE TO PRIORITY APPLICATIONS

This U.S. nonprovisional application claims the benefit of U.S. Patent Application Ser. No. 61/599,184 for a Loose-Tube Optical-Fiber Cable (filed Feb. 15, 2012) and U.S. Patent Application Ser. No. 61/678,300 for a Loose-Tube Optical-Fiber Cable (filed Aug. 1, 2012), each of which is hereby incorporated by reference in its entirety.

STATEMENT REGARDING FEDERALLY SPONSORED RESEARCH OR DEVELOPMENT

This invention was made with U.S. Government support under Contract No. DE-EE0002786 awarded by the U.S. Department of Energy. The U.S. Government has certain rights in this invention.

FIELD OF THE INVENTION

The present invention relates to loose-tube optical-fiber cables and, more typically, loose-tube optical-fiber cables that are capable of operating in high-temperature environments.

BACKGROUND

Optical-fiber cables are often needed to withstand harsh environments. For example, cables deployed within geothermal wells need to be able to withstand high temperatures.

Some conventional cable components are unsuitable for use at high temperatures. For example, thixotropic gels, which are commonly used to provide water-blocking and coupling functionality, are typically unable to withstand such high temperatures. Accordingly, optical-fiber cables intended for high-temperature operations typically employ dry designs, which eliminate the thixotropic gel from the optical-fiber cable.

One problem associated with dry-cable designs is that the optical fibers contained within the cable are often insufficiently coupled to the cable and/or buffer tube enclosing the optical fibers. In the absence of sufficient coupling, the optical fibers can bunch up or stretch inside the cable, which can lead to undesirable attenuation.

In addition to possessing high temperatures, geothermal wells also typically possess a hydrogen-rich environment. Hydrogen may diffuse into optical fibers and react with the silicate glass, thereby producing hydroxide ions. This reaction damages the optical fiber, quickly rendering it useless in hydrogen-rich environments.

There is currently no optical-fiber cable that is capable of withstanding the high-temperature and hydrogen-rich environment of geothermal wells for an extended period (e.g., more than a few days).

Accordingly, a need exists for an improved loose-tube optical-fiber cable that is capable of functioning in high-temperature and hydrogen-rich environments.

SUMMARY

Accordingly, in one aspect, the present invention embraces an optical-fiber buffer tube that is capable of operating at high temperatures. The optical-fiber buffer tube includes an optical fiber that is capable of operating at temperatures of at least about 200° C. (e.g., about 300° C. and higher, such as about 350° C.). A protective tube surrounds the optical fiber. The protective tube is formed from a material that is capable of operating at temperatures of at least about 200° C. (e.g., about 300° C. and higher). A plurality of discrete deposits of adhesive material couple the optical fiber to the protective tube. The adhesive material is capable of operating at temperatures of at least about 200° C. (e.g., about 300° C. and higher). The buffer tube typically has a buffer-tube adhesive filling coefficient of less than about 0.01.

In another aspect, the present invention embraces an optical-fiber cable that includes the foregoing optical-fiber buffer tube and a high-conductivity conductor. A surrounding longitudinal strength member not only provides mechanical protection but also helps the optical-fiber cable to achieve an outstanding self-supporting length (e.g., at least about 5,000 feet) at elevated operating temperatures (e.g., about 300° C. and higher).

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
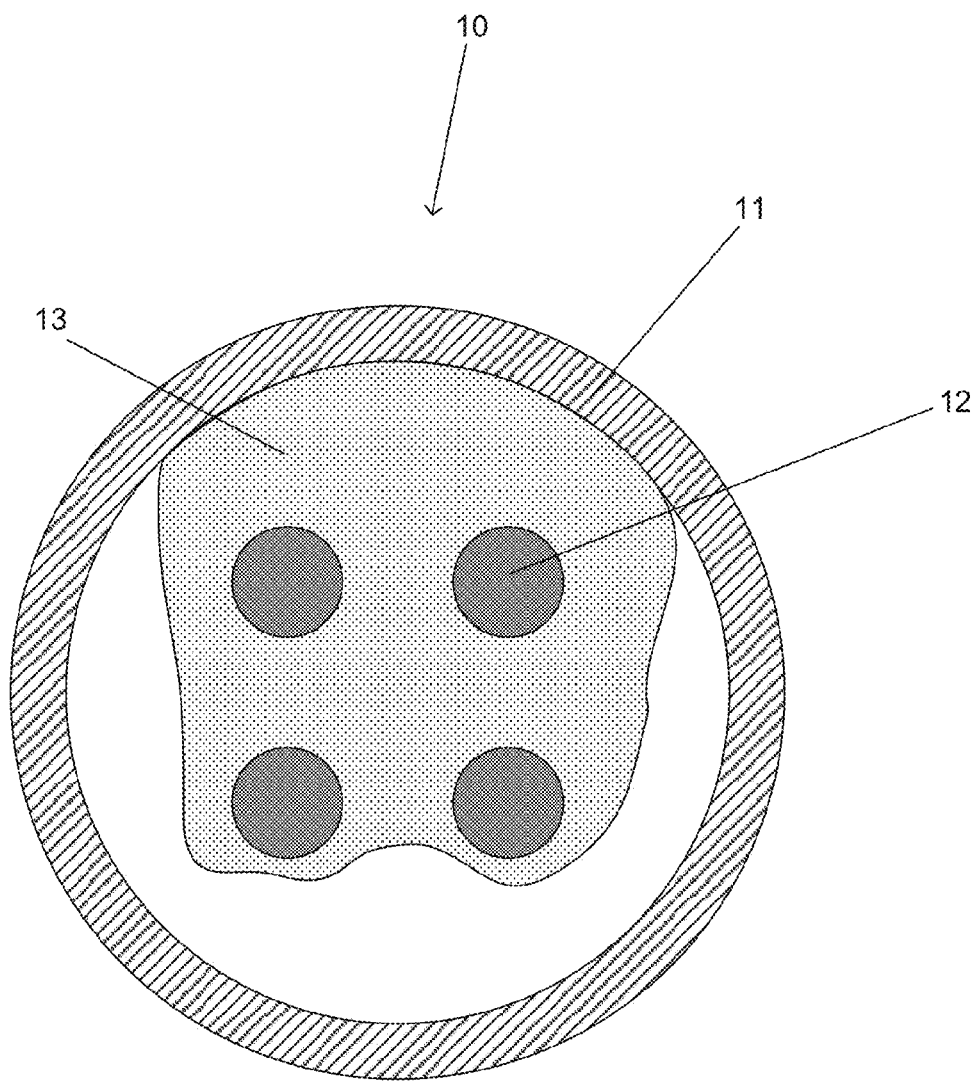
FIG. 1 schematically depicts a cross-sectional view of an exemplary optical-fiber buffer tube according to the present invention.

In one aspect, the present invention embraces an optical-fiber buffer tube that is capable of operating in high-temperature environments of at least about 200° C., such as at least about 300° C. (e.g., a temperature of 370° C. or more). In this regard, FIG. 1 schematically depicts an optical-fiber buffer tube 10 having one or more optical fibers 12 (e.g., three or four optical fibers) positioned within a protective tube 11. An adhesive 13 helps to couple the optical fibers 12 to the protective tube 11.

The protective tube 11 (e.g., a longitudinally laser-welded metal tube) is typically formed of a material capable of operating at temperatures of at least about 200° C. (e.g., at least about 300° C.). Typically, the protective tube 11 is metallic (e.g., stainless steel, such as type 304 or type 316L). More typically, the protective tube is formed from a nickel-chromium alloy (e.g., alloy 625 or alloy 825). Alternatively, the protective tube 11 may be formed of a polymeric material that is capable of withstanding high temperatures, such as a fluoropolymer (e.g., perfluoroalkoxy (PFA)). An exemplary fluoropolymer is Ecctreme™ 300C fluoropolymer, which is commercially available from DuPont. In this regard, the technical paper, Jacob Lahijani et al., DuPont Chemicals And Fluoroproducts, *A New Class Of Perfluoropolymers: High-Temperature Epitaxial Co-Crystalline (ECC) Perfluoropolymer Resins* (2011), which is hereby incorporated by reference in its entirety, describes the Ecctreme™ 300C fluoropolymer in more detail.

The protective tube 11 typically has an outer diameter of between about 1.4 millimeters and 5.0 millimeters and a thickness of between about 0.1 millimeter and 0.4 millimeter. In an exemplary embodiment, the protective tube 11 contains four optical fibers and has an outer diameter of 3.2 millimeters and an inner diameter of 2.8 millimeters. In another exemplary embodiment, the protective tube 11 contains four optical fibers and has an outer diameter of 1.8 millimeters and an inner diameter of 1.5 millimeters.

Table I (below) depicts tensile-testing data with respect to an exemplary 3.2-millimeter protective steel tube as provided in Appendix 1 of priority U.S. Patent Application Ser. No. 61/678,300. Tensile properties were measured at 10 millimeters per minute, and modulus of elasticity was measured at 1 millimeter per minute. Testing, which was performed at 23° C. and 50 percent relative humidity, was conducted in accordance with ISO 6892.

TABLE I

| N | E-modulus (MPa) | Tensile strength (MPa) | Tensile stress @ 0.1% (MPa) | Tensile stress @ 0.2% (MPa) | Tensile strain @ break (%) | Cross-section (mm$^2$) |
|---|---|---|---|---|---|---|
| 1 | 161,214 | 948.8 | 671.3 | 745.5 | 10.5 | 1.885 |
| 2 | 165,857 | 945.0 | 663.0 | 741.3 | 11.8 | 1.885 |
| 3 | 153,876 | 945.8 | 670.7 | 748.8 | 11.7 | 1.885 |
| mean (n = 3) | 160,316 | 946.5 | 668.3 | 745.2 | 11.4 | — |
| s | 6,041 | 2.1 | 4.6 | 3.7 | 0.7 | — |
| P (≤µ) = 0.95 | 145,319 | 941.4 | 656.8 | 735.9 | 9.6 | — |
| P (µ≤) = 0.95 | 175,312 | 951.6 | 679.8 | 754.5 | 13.1 | — |

With respect to the present optical-fiber buffer tube, the optical fibers are typically capable of operating at temperatures of at least about 200° C. (e.g., at least about 300° C.). In this regard, the optical fibers may possess a polyimide coating. In addition, the optical fibers typically possess low sensitivity to hydrogen. An exemplary multimode optical fiber possessing low sensitivity to hydrogen is disclosed in commonly assigned U.S. Patent Application Publication No. 2013/0004135 A1, which is hereby incorporated by reference in its entirety. Another exemplary multimode optical fiber possessing low sensitivity to hydrogen is disclosed in commonly assigned U.S. Patent Application Publication No. US2012/0039361, which is hereby incorporated by reference in its entirety. Another exemplary multimode optical fiber is disclosed in commonly assigned U.S. Patent Application Publication No. 2012/0275751 A1, which is hereby incorporated by reference in its entirety. In one exemplary embodiment, the optical fibers are bend insensitive.

To supplement the present disclosure with respect to hydrogen resistance, this application incorporates entirely by reference the following patents and patent application publications: U.S. Pat. Nos. 6,201,917; 6,597,850; 6,704,485; 6,754,423; 6,853,798; 7,630,611; U.S. Patent Application Publication Nos. US2003/0031441; 2004/0099015.

In a typical embodiment, the optical-fiber buffer tube 10 includes one or more optical fibers 12 that are capable of distributed temperature sensing. An optical fiber may utilize various mechanisms for providing distributed temperature sensing, including Brillouin scattering, Raman scattering, and Rayleigh scattering. In a particular embodiment, the buffer tube includes one or more (e.g., two) single-mode optical fibers that provide data transmission and one or more (e.g., two) multimode optical fibers that provide Raman temperature sensing.

The optical fibers may be sandwiched, encapsulated, and/or edge bonded (e.g., with a polymer capable of withstanding high temperatures) to form an optical-fiber ribbon. The optical-fiber ribbon can be divisible into subunits. Moreover, a plurality of such optical-fiber ribbons may be aggregated to form a ribbon stack, which can have various configurations (e.g., sizes and shapes).

The buffer tube 10 is typically substantially free of thixotropic filling greases (e.g., has a dry buffer-tube structure). Accordingly, the free space within the buffer tube 10 is typically filled with air. Alternatively, the free space within the buffer tube 10 may be filled with an inert gas (e.g., helium or argon). In another alternative embodiment, the free space within the buffer tube 10 may be filled with a liquid that is capable of providing adequate performance at high temperatures.

As depicted in FIG. 1, an adhesive 13 typically couples (e.g., with mechanical and frictional coupling) the optical fibers 12 to the protective tube 11. Typically, the adhesive 13 is silicone (e.g., a curable silicone adhesive). Exemplary silicone adhesives include Duraseal™ 1531 adhesive, which is commercially available from Cotronics Corp., LOCTITE® 5398™ adhesive, which is commercially available from Henkel Corp., and Loctite™ Silicomet JS 533 adhesive, which is commercially available from Henkel Corp. It is thought that LOCTITE® 5398™ adhesive and Loctite™ Silicomet JS 533 adhesive have substantially the same composition. In this regard, Appendices 2-4 of priority U.S. Patent Application Ser. No. 61/678,300 include technical information regarding Duraseal™ 1531 adhesive, LOCTITE® 5398™ adhesive, and Loctite™ Silicomet JS 533 adhesive, respectively. As noted, priority U.S. Patent Application Ser. No. 61/678,300, including its appendices, is incorporated by reference in its entirety.

Silicone-based adhesives are advantageous because they have desirable properties (e.g., hardness, elasticity, and strength) at high temperatures. In this regard, Loctite™ Silicomet JS 533 adhesive has an un-aged, room temperature Shore A hardness of about 40. In addition, Loctite™ Silicomet JS 533 adhesive has a Shore A hardness of between about 30 and 35 at a temperature of about 300° C.

The Silicomet JS 533 adhesive is a particularly stable adhesive having low weight loss at high temperature. In this regard, the Silicomet JS 533 adhesive has a weight loss of about 30 percent after 180 minutes at 400° C. In contrast, the Duraseal™ 1531 adhesive has a weight loss of over 50 percent after 30 minutes at 400° C. Appendices 5-6 of priority U.S. Patent Application Ser. No. 61/678,300 depict oxygen-induction time (OIT) analysis of the Silicomet JS 533 adhesive and the Duraseal™ 1531 adhesive, respectively.

Because the presence of hydrogen can lead to undesirable optical-fiber attenuation, the silicone adhesive is also typically selected so that it does not release an undesirable amount of hydrogen as it cures. That said, non-silicone adhesives having similar properties are within the scope of the present invention.

In order to couple the optical fibers to the protective tube, the adhesive, typically in a substantially uncured state, may be applied onto the inner surface of the protective tube or onto the optical fibers. Typically, the adhesive is applied as a plurality of discrete deposits of adhesive material (e.g., intermittent beads). In the case of a metallic protective tube, each discrete deposit is typically applied (e.g., onto the protective tube) between 1 centimeter and 3 centimeters before the weld point (i.e., where a metal strip is welded to form a tube) and the die facilitating metal-tube drawdown (i.e., a die for stretching the tube to its final diameter). Typically, each discrete deposit is applied onto the protective tube (e.g., with an injection pump) before the point at which the optical fibers are inserted into the protective tube.

As depicted in FIG. 1, at a buffer-tube cross section, a discrete deposit of adhesive need not entirely fill the free space within the buffer tube (e.g., the space not occupied by the optical fibers). That said, it is within the scope of the present invention for a discrete deposit of adhesive to substantially fill the free space within the buffer tube at a buffer-tube cross section.

Each discrete deposit (e.g., discrete domain) of adhesive material typically includes between about 5 $mm^3$ and 500 $mm^3$ of adhesive, more typically between about 10 $mm^3$ and 150 $mm^3$ (e.g., between about 20 $mm^3$ and 150 $mm^3$) of adhesive. The length of each discrete deposit of adhesive is typically between about 1 centimeter and 2 centimeters, although longer lengths (e.g., about 1 meter or more) are within the scope of the present invention.

Relatively small amounts of adhesive may be sufficient to adequately couple the optical fibers to the protective tube. Accordingly, adjacent discrete deposits of adhesive material may be positioned about 5 meters to 1000 meters apart, more typically between about 50 meters and 500 meters apart (e.g., between about 100 meters and 200 meters apart). In other exemplary embodiments, smaller discrete deposits may be positioned closer together (e.g., no more than 25 meters apart, such as 10-15 meters apart).

Consequently, cables and buffer tubes in accordance with the present invention may have relatively low adhesive filling coefficients.

As used herein, the term "cable adhesive filling coefficient" refers to the ratio of (i) the volume of the adhesive material between optical fiber(s) (e.g., an optical-fiber bundle or optical-fiber ribbon stack) and the nearest surrounding, protective enclosure (e.g., a buffer tube) to (ii) the inner volume of the optical-fiber cable (i.e., defined by the inner boundary of the cable's protective outer jacket or tube).

Furthermore, as used herein, the term "buffer-tube adhesive filling coefficient" refers to the ratio of (i) the volume of the adhesive material between optical fiber(s) and a surrounding buffer tube (e.g., used for coupling an enclosing tape to the buffer tube) to (ii) the inner volume of the buffer tube (i.e., defined by the inner boundary of the buffer tube).

The cable adhesive filling coefficient is typically measured using a 100-meter cable sample. Similarly, the buffer-tube adhesive filling coefficient is typically measured using a 100-meter buffer-tube sample. That said, adhesive filling coefficients may be measured using various sample lengths (e.g., 25 meters, 50 meters, 500 meters, 1000 meters, etc.).

Buffer tubes in accordance with the present invention may have a buffer-tube adhesive filling coefficient of less than about 0.01 (i.e., less than about 1 percent). Typically, the buffer-tube adhesive filling coefficient is between about 0.00005 and 0.001 (e.g., about 0.01 percent), such as between about 0.0002 and 0.0005.

Using an adhesive to couple the optical fibers to the buffer tube ensures a proper excess fiber length (EFL) even when the buffer tube is under load. EFL is the relative difference between the actual individual optical-fiber length and the length of the buffer tube enclosing the optical fiber. EFL is typically expressed as a percentage, namely: ((optical fiber length−buffer tube length)÷buffer tube length)×100. Typically, all of the optical fibers within the present optical-fiber buffer tubes have approximately the same EFL. In this regard, each optical fiber typically has an EFL of less than about 1 percent (e.g., no more than about 0.8 percent), more typically less than about 0.5 percent (e.g., less than about 0.3 percent).

In one embodiment, the optical-fiber buffer tube includes water-blocking or water-swellable material that is capable of withstanding high temperatures.

In another aspect, the present invention embraces an optical-fiber cable (e.g., a geothermal fiber optic cable) that is capable of operating in high temperature environments (e.g., having a temperature of 370° C. or more).

Figure 2:
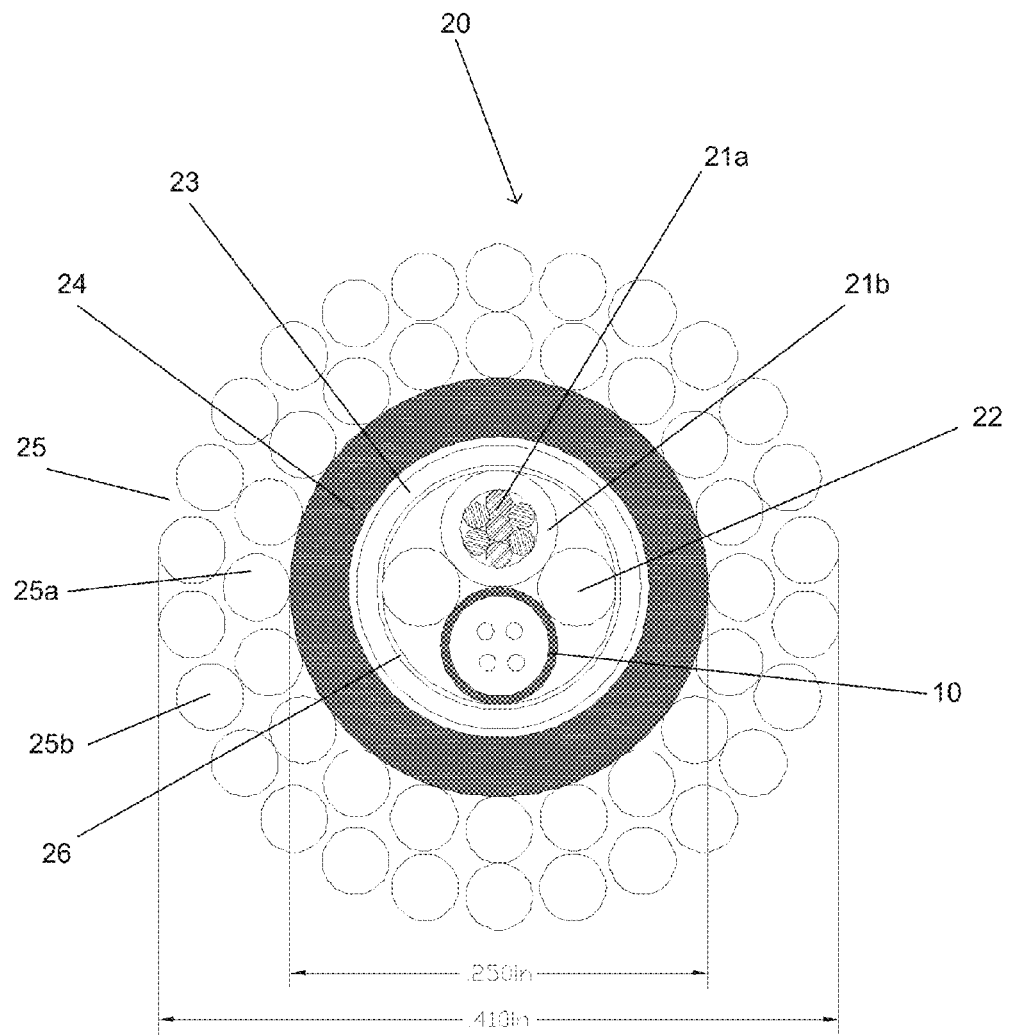
FIG. 2 schematically depicts a cross-sectional view of an exemplary optical-fiber cable according to the present invention.

FIG. 2 schematically depicts an exemplary optical-fiber cable 20. The optical-fiber cable 20 typically includes one or more optical-fiber buffer tubes 10, which are capable of operating at temperatures of at least about 200° C. (e.g., at least about 300° C.), and one or more high-conductivity conductors 21a.

Typically, the high-conductivity conductor 21a is copper, although other high-conductivity metals (e.g., aluminum, silver, or gold) or metal alloys (e.g., a copper-nickel alloy containing about 27 percent nickel) may be employed as an alternative to copper. In a more typical embodiment, the high-conductivity conductor may be nickel-coated copper (e.g., nickel-coated copper having a nickel content of about 2 percent). The high-conductivity conductor 21a may be solid (i.e., contain a single wire) or stranded (i.e., containing a plurality of stranded wires).

The high-conductivity conductor 21a may be used to power equipment within a geothermal well. In this regard, the high-conductivity conductor 21a may be 18 AWG (American Wire Gauge) in size (i.e., having a cross sectional area of 1,620 circular mils), thus having a diameter of about 1.024 millimeters. In another embodiment, the high-conductivity conductor 21a may be 16 AWG in size (i.e., having a cross sectional area of 2,580 circular mils), thus having a diameter of about 1.291 millimeters. The foregoing notwithstanding, those of ordinary skill in the art will appreciate that the size of the high conductivity conductor will depend upon the desired current-carrying capacity of the optical-fiber cable 20. Indeed, because the current carrying capacity of the optical-fiber cable 20 depends upon the cross sectional area of the high conductivity conductor, greater current-carrying capacity requirements typically require a larger diameter high-conductivity conductor.

The high-conductivity conductor 21a is typically insulated with a polymeric material (e.g., insulator 21b) that is capable of withstanding high temperatures, such as a fluoropolymer (e.g., a perfluoroalkoxy (PFA)). For example, the insulator 21b may be formed from Ecctreme™ 300C fluoropolymer.

The optical-fiber cable 20 may include one or more internal filler members 22 (e.g., filler rods). For example, the optical-fiber cable 20 may include one or more polymeric filler rods (e.g., rods formed from a fluoropolymer, such as Ecctreme™ 300C fluoropolymer) positioned substantially parallel to the high-conductivity conductor 21a and the optical-fiber buffer tube 10. Alternatively, the internal filler members 22 may be formed from fiberglass.

As depicted in FIG. 2, a reinforcing belt 23 typically encloses the internal components (e.g., the optical-fiber buffer tube 10, the high-conductivity conductor 21a, and the internal filler members 22) of the optical-fiber cable 20. The reinforcing belt 23 is typically formed of a polymeric material that is capable of withstanding high temperatures, such as a fluoropolymer (e.g., a perfluoroalkoxy (PFA)). For example, the reinforcing belt 23 may be formed from Ecctreme™ 300C fluoropolymer. The reinforcing belt is typically continuous along the entire length of the cable. The belt typically has a thickness of between about 0.5 millimeter and 1 millimeter (e.g., about 0.8 millimeter).

In one embodiment, an enclosing tape 26 may be positioned between the reinforcing belt 23 and the internal components (e.g., the optical-fiber buffer tube 10, the high-conductivity conductor 21a, and the internal filler members 22). The reinforcing belt 23 may be a fluoropolymer, such as polytetrafluoroethylene (PTFE).

An outer metal tube 24 (i.e., outer jacket) typically encloses the reinforcing belt 23 and the other internal components. The outer tube 24 is typically formed from a nickel-chromium alloy (e.g., alloy 625 or alloy 825). Alternatively, the outer tube may be formed from stainless steel (e.g., stainless steel type 304 or type 316L), titanium (e.g., titanium grade 29), or a nickel cobalt alloy (e.g., MP35N). In yet another embodiment, the outer tube may be formed of a polymeric material that is capable of withstanding high temperatures, such as a fluoropolymer.

In an exemplary embodiment, the outer tube has an outer diameter of between about 6 millimeters and 7 millimeters (e.g., about 6.35 millimeters). The outer tube typically has a thickness of between about 0.5 millimeter and 1.5 millimeters (e.g., about 0.71 millimeter or about 0.89 millimeter).

The optical-fiber cable 20 typically includes a longitudinal strength member 25 surrounding the outer tube 24. The longitudinal strength member 25 is typically formed of the same material as the outer tube 24.

In a typical embodiment, the longitudinal strength member 25 includes a first layer 25a of metallic rods helically wrapped around the outer tube 24. The longitudinal strength member 25 also typically includes a second layer 25b of metallic rods helically wrapped around the first layer 25a. Typically, the first layer 25a and the second layer 25b have the opposite chirality (e.g., the first layer 25a may form a right-hand helix and the second layer 25b may form a left-hand helix). In other words, the first layer 25a and the second layer 25b may be contrahelically wrapped around the outer tube 24. The longitudinal strength member typically provides coverage (i.e., the extent to which the underlying material, namely the outer tube, is concealed) of at least about 75 percent (e.g., about 95 percent outer-tube coverage).

In an exemplary embodiment, the first layer 25a may include twenty metallic rods, each having a diameter of about 1 millimeter. Furthermore, the second layer 25b may include twenty-six metallic rods, each having a diameter of about 1 millimeter. Accordingly, the longitudinal strength member 25 may have an outer diameter of between about 10 millimeters and 11 millimeters (e.g., about 10.4 millimeters).

The longitudinal strength member 25 provides mechanical protection for the optical-fiber cable 20. In addition, the longitudinal strength member 25 helps to improve the self-supporting length of the optical-fiber cable 20.

The theoretical self-support length ($SSL_T$) of an optical-fiber cable in steam or air may be determined in accordance with the following equation:

$$SSL_T = \frac{L_{YS} - M_T}{UW}$$

where,
$L_{YS}$=load at yield strength;
$M_T$=weight of tool or bob at bottom of cable;
UW=unit weight of cable (lbs/ft); and
$SSL_T$=theoretical self-support length.

The theoretical self-support length, however, fails to account for a number of factors that affect the actual self-support length of a cable. For example, the theoretical self-support length does not take into account the loss of strength due to an increase in temperature or the added force caused by cable removal. Moreover, the theoretical self-support length does not take into account weak points in a cable due to natural defects, handling-induced defects, corrosive pitting, or cyclic fatigue weakening.

Accordingly, the actual self-support length ($SSL_A$) of an optical-fiber cable in steam or air may be determined in accordance with the following equation:

$$SSL_A = \frac{L_{YS}(1 - S_T) - (M_T - F_R)}{UW \times SF}$$

where,
$L_{YS}$=load at yield strength;
$S_T$=strength loss percentage;
$M_T$=weight of tool or bob at bottom of cable;
$F_R$=maximum force induced during tool removal;
UW=unit weight of cable (lbs/ft);
SF=safety factor; and
$SSL_A$=actual self-support length.

For an optical-fiber cable with a stainless steel outer tube, but without a longitudinal strength member, it was calculated that the cable had an actual self-support length of less than 5,000 feet, namely 4,980 feet. In particular, the stainless steel outer tube was formed from 316L stainless steel. The outer tube had an outer diameter of about 6.35 millimeters and a thickness of about 0.89 millimeter. In addition, for the calculation it was assumed that (i) the operating temperature was 300° C., (ii) $L_{YS}$=2128 lbs, (iii) $S_T$=25%, (iv) $M_T$=100 lbs, (v) $F_R$=500 lbs, (vi) UW=0.1 lbs/ft, and (vii) SF=2.

In contrast, the present optical-fiber cables typically have an actual self-support length of greater than about 5,000 feet, more typically greater than about 10,000 feet (e.g., greater than about 15,000 feet). In this regard, it was calculated that an exemplary optical-fiber cable in accordance with the present invention actually had a self-supporting length of 16,600 feet. The exemplary optical-fiber cable had a 316L-stainless-steel outer tube with an outer diameter of 6.35 millimeters and a thickness of 0.89 millimeter. The exemplary optical-fiber cable had a longitudinal strength member with two layers. The first layer had twenty 316L-stainless-steel rods, each having a diameter of about 1 millimeter. The second layer had twenty-six 316L-stainless-steel rods, each having a diameter of about 1 millimeter. In addition, for the calculation it was assumed that (i) the operating temperature was 300° C., (ii) $L_{YS}$=13800 lbs, (iii) $S_T$=25%, (iv) $M_T$=100 lbs, (v) $F_R$=500 lbs, (vi) UW=0.29 lbs/ft, and (vii) SF=2.

Testing of various optical-fiber buffer-tube designs has been performed.

Sample I

In Sample I, an optical-fiber buffer tube had a protective tube formed from type 304 stainless steel. The protective tube had an outer diameter of 3.2 millimeters and an inner diameter of 2.8 millimeters. The optical-fiber buffer tube included four polyimide-coated optical fibers, namely one hydrogen-insensitive multimode optical fiber as disclosed in commonly assigned U.S. Patent Application Publication No. US2012/0039361; one standard single-mode fiber, in particular an Enhanced Single Mode Fiber, which is commercially available from Draka (Claremont, N.C.) and which meets the ITU-T G.652.D recommendations (November 2009); one bend-insensitive single-mode fiber, in particular a BendBrightXS® optical fiber, which is commercially available from Draka (Claremont, N.C.) and which meets the ITU-T G.652.D recommendations (November 2009) and the ITU-T G.657.A1 recommendations (November 2009); and one hydrogen-insensitive single-mode fiber, in particular a Single Mode Fiber, Pure Core, Caron-Polyimide SMF-40-CP-125-1 (see Appendix 7 of priority U.S. Patent Application Ser. No. 61/678,300), which is commercially available from Verrillon. Discrete deposits of Duraseal™ 1531 adhesive were used to couple the optical fibers to the protective tube. Each discrete deposit had a length of about 10 centimeters. Discrete deposits were placed about 25 meters apart.

Figure 3:
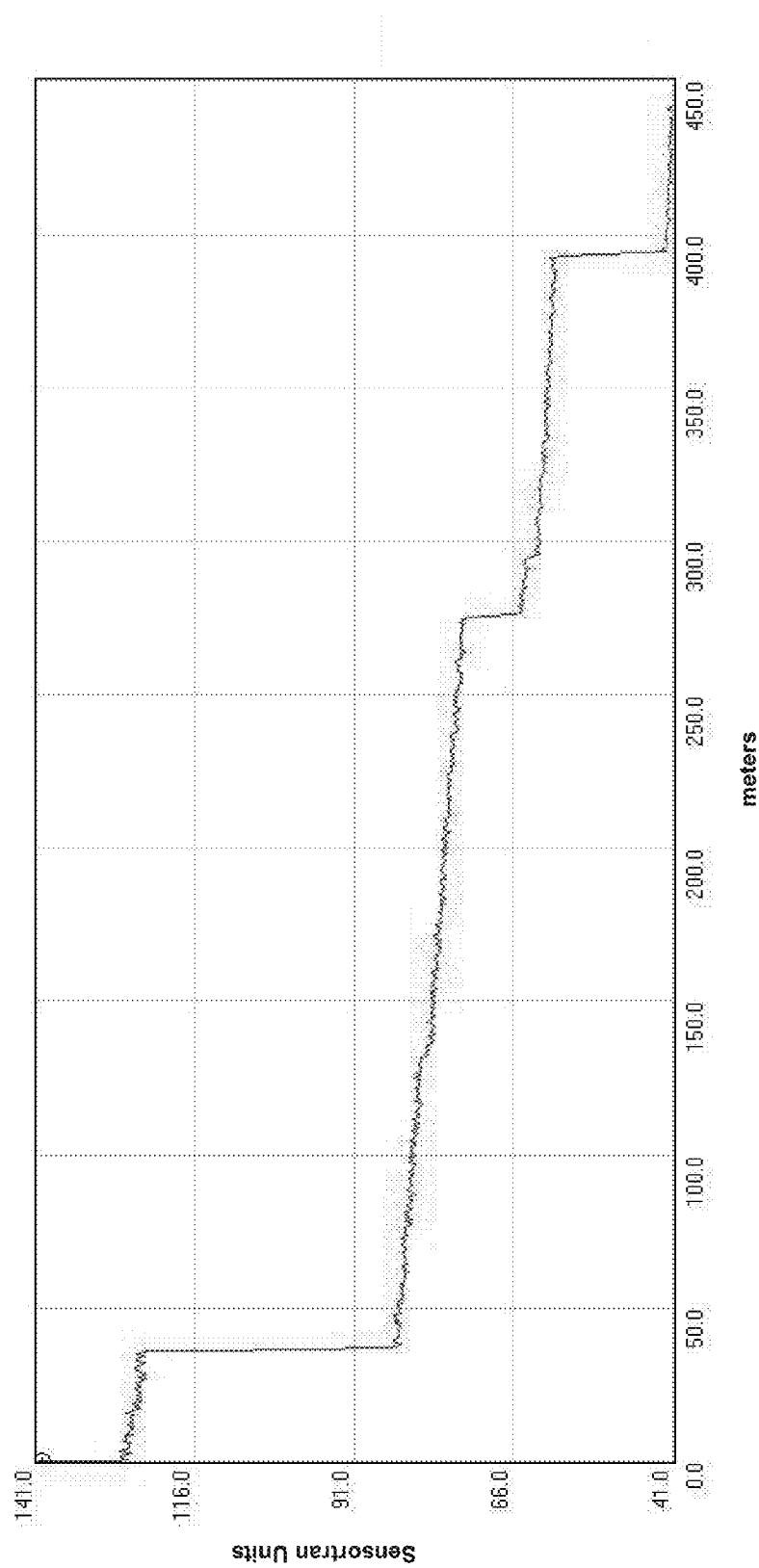
FIG. 3 depicts an OTDR trace for an optical fiber in a first exemplary optical-fiber buffer tube.

FIG. 3 depicts an OTDR trace taken with a Sensortran Raman DTS unit. Four undesirable point discontinuities can be seen in FIG. 3.

Sample II

In Sample II, an optical-fiber buffer tube had a protective tube formed from type 304 stainless steel. The protective tube had an outer diameter of 3.2 millimeters and an inner diameter of 2.8 millimeters. The optical-fiber buffer tube included four polyimide-coated optical fibers, namely one hydrogen-insensitive multimode optical fiber as disclosed in commonly assigned U.S. Patent Application Publication No. US2012/0039361; one standard single-mode fiber, in particular an Enhanced Single Mode Fiber, which is commercially available from Draka (Claremont, N.C.) and which meets the ITU-T G.652.D recommendations (November 2009); one bend-insensitive single-mode fiber, in particular a BendBrightXS® optical fiber, which is commercially available from Draka (Claremont, N.C.) and which meets the ITU T G.652.D recommendations (November 2009) and the ITU-T G.657.A1 recommendations (November 2009); and one hydrogen-insensitive single-mode fiber, in particular a Single Mode Fiber, Pure Core, Caron-Polyimide SMF-40-CP-125-1 (see Appendix 7 of priority U.S. Patent Application Ser. No. 61/678,300), which is commercially available from Verrillon. Discrete deposits of Duraseal™ 1531 adhesive were used to couple the optical fibers to the protective tube. Each discrete deposit had a length of between about 1 centimeter and 2 centimeters. Discrete deposits were placed about 25 meters apart.

Sample III

In Sample III, an optical-fiber buffer tube had a protective tube formed from type 304 stainless steel. The protective tube had an outer diameter of 3.2 millimeters and an inner diameter of 2.8 millimeters. The optical-fiber buffer tube included four polyimide-coated optical fibers, namely one hydrogen-insensitive multimode optical fiber as disclosed in commonly assigned U.S. Patent Application Publication No. US2012/0039361; one standard single-mode fiber, in particular an Enhanced Single Mode Fiber, which is commercially available from Draka (Claremont, N.C.) and which meets the ITU-T G.652.D recommendations (November 2009); one bend-insensitive single-mode fiber, in particular a BendBrightXS® optical fiber, which is commercially available from Draka (Claremont, N.C.) and which meets the ITU-T G.652.D recommendations (November 2009) and the ITU-T G.657.A1 recommendations (November 2009); and one hydrogen-insensitive single-mode fiber, in particular a Single Mode Fiber, Pure Core, Caron-Polyimide SMF-40-CP-125-1 (see Appendix 7 of priority U.S. Patent Application Ser. No. 61/678,300), which is commercially available from Verrillon. Discrete deposits of Loctite™ Silicomet JS 533 adhesive were used to couple the optical fibers to the protective tube. Each discrete deposit had a length of between about 1 centimeter and 2 centimeters. Discrete deposits were placed about 25 meters apart.

Testing of Sample II and Sample III was concurrently performed in a laboratory oven. Attenuation measurements, which employed an optical time domain reflectometer (OTDR), and Brillouin frequency measurements, which employed Brillouin optical time domain analysis (BOTDA), began at room temperature (i.e., about 23° C.). Afterwards, Sample II and Sample III were placed in the oven. The temperature of the oven was increased to temperatures of 50° C., 100° C., 150° C., 200° C., 250° C., and 300° C. The temperatures of Sample II and Sample III were allowed to stabilize at each temperature. The temperature of the oven was then held at 300° C. with readings being taken after four days and after nine more days. Finally, the temperature of the oven was cycled between 50° C., 300° C., 50° C., 300° C., and 50° C. with readings being taken at 50° C. and 300° C. Table II (below) depicts the duration of each step of the foregoing temperature testing.

TABLE II

| Test Duration (hours) | Oven Temperature (° C.) |
| --- | --- |
| 2.0 | 50 |
| 2.3 | 100 |
| 2.3 | 150 |
| 18.7 | 200 |
| 3.5 | 250 |
| 2.3 | 300 |
| 102.9 | 300 |
| 218.7 | 300 |
| 4.0 | 50 |
| 55.5 | 300 |
| 0.5 | 50 |
| 6.0 | 300 |
| 0.3 | 50 |

Figure 4:
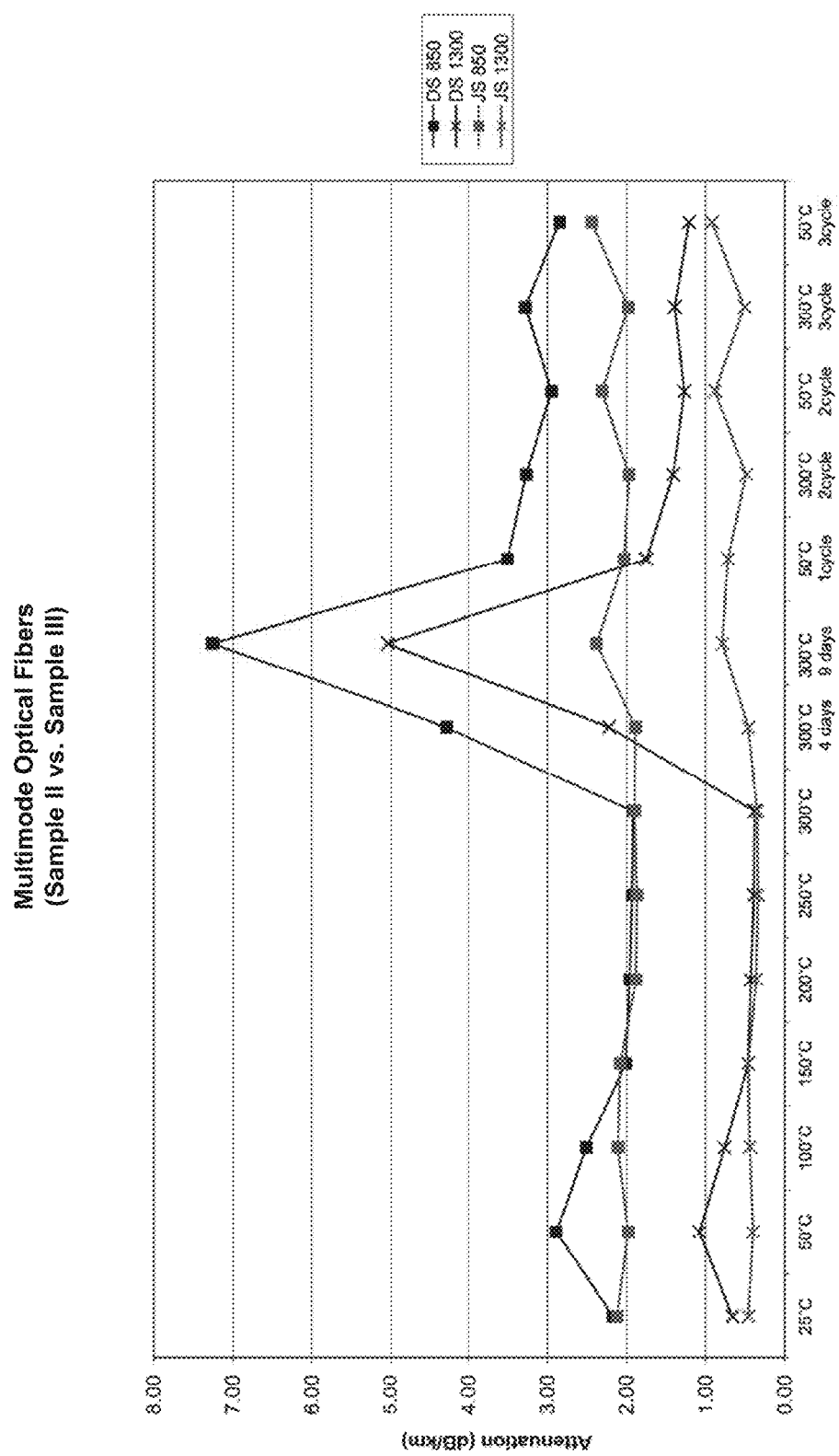
FIG. 4 depicts temperature-dependent attenuation data for multimode fibers contained in second and third exemplary optical-fiber buffer tubes.

FIG. 4 depicts temperature-dependent attenuation data for the multimode fibers contained in Sample II and Sample III, respectively. As depicted in FIG. 4, the multimode fiber in Sample III demonstrated lower attenuation at both 850 nanometers and 1300 nanometers.

Figure 5:
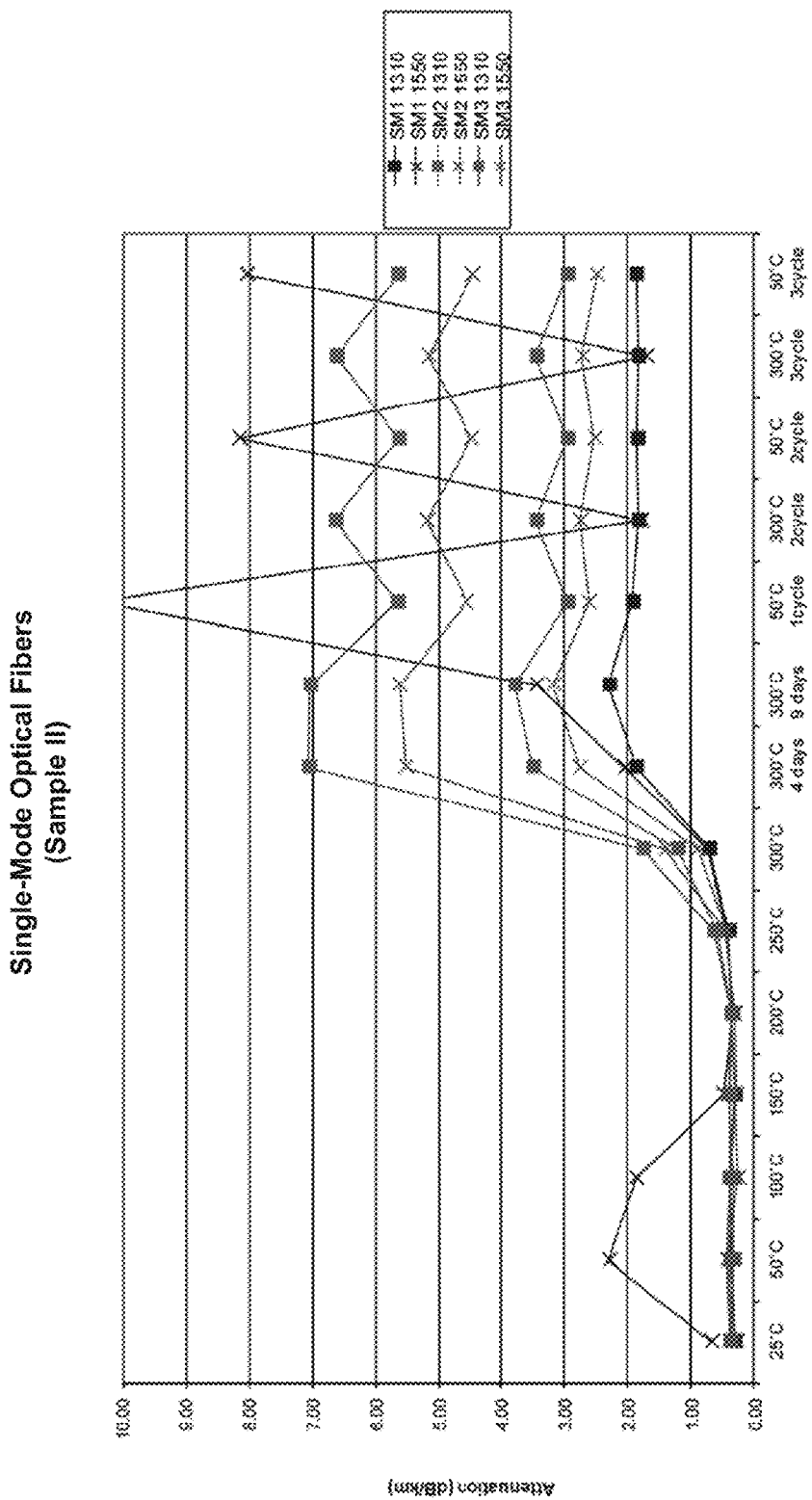
FIG. 5 depicts temperature-dependent attenuation data for single-mode fibers contained in the second exemplary optical-fiber buffer tube.

FIG. 5 depicts temperature-dependent attenuation data for the single-mode fibers contained in Sample II. In FIG. 5, SM1 was the standard single-mode fiber, SM2 was the bend-insensitive single-mode fiber, and SM3 was the hydrogen-insensitive single-mode fiber.

Figure 6:
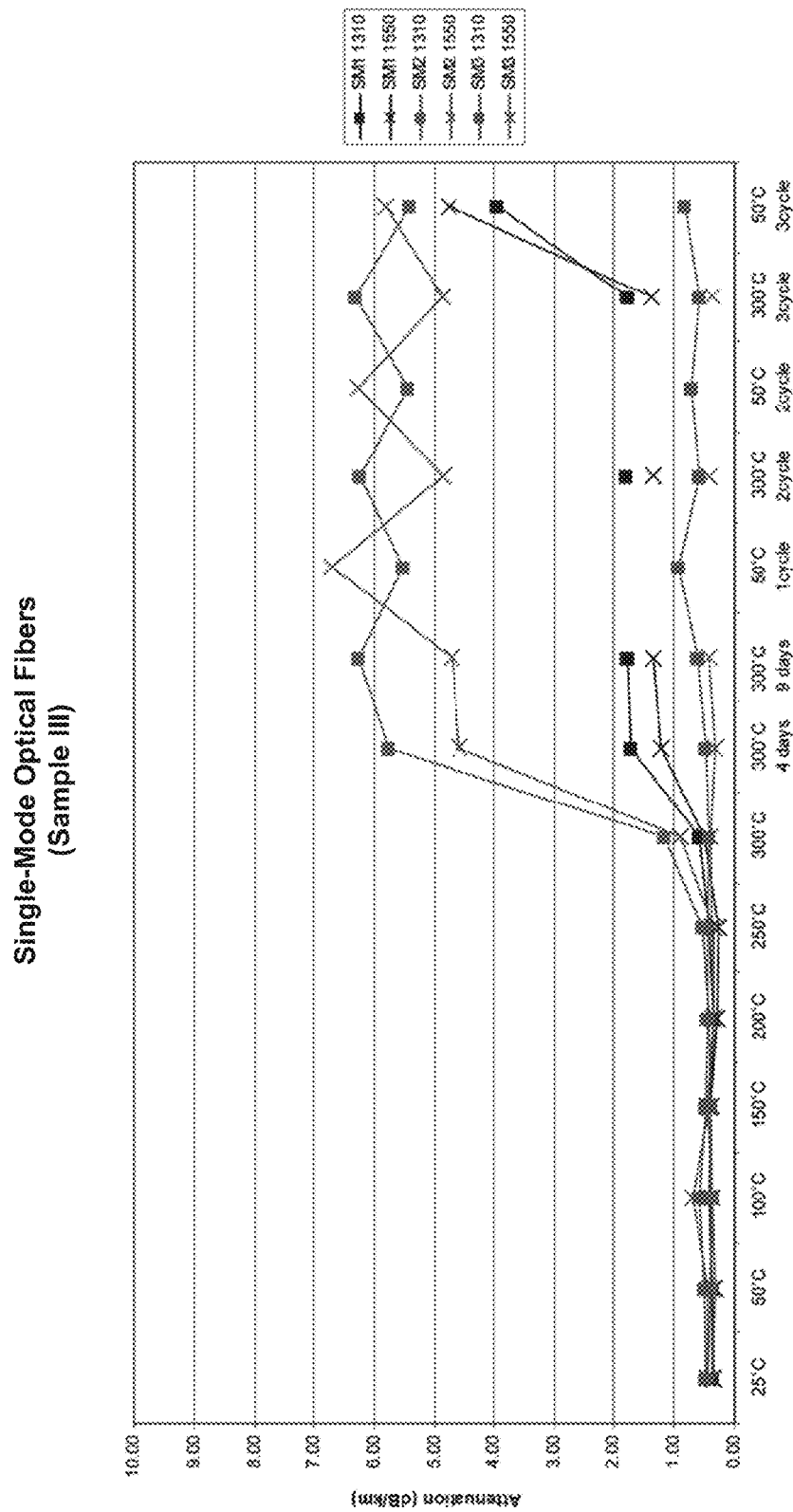
FIG. 6 depicts temperature-dependent attenuation data for single-mode fibers contained in the third exemplary optical-fiber buffer tube.

FIG. 6 depicts temperature-dependent attenuation data for the single-mode fibers contained in Sample III. In FIG. 6, SM1 was the standard single-mode fiber, SM2 was the bend-insensitive single-mode fiber, and SM3 was the hydrogen-insensitive single-mode fiber.

As shown in FIGS. 5-6, the single-mode fibers in Sample III demonstrated lower attenuation at both 1310 nanometers and 1550 nanometers. In particular, the hydrogen-insensitive single-mode optical fiber in Sample III demonstrated excellent attenuation.

Figure 7:
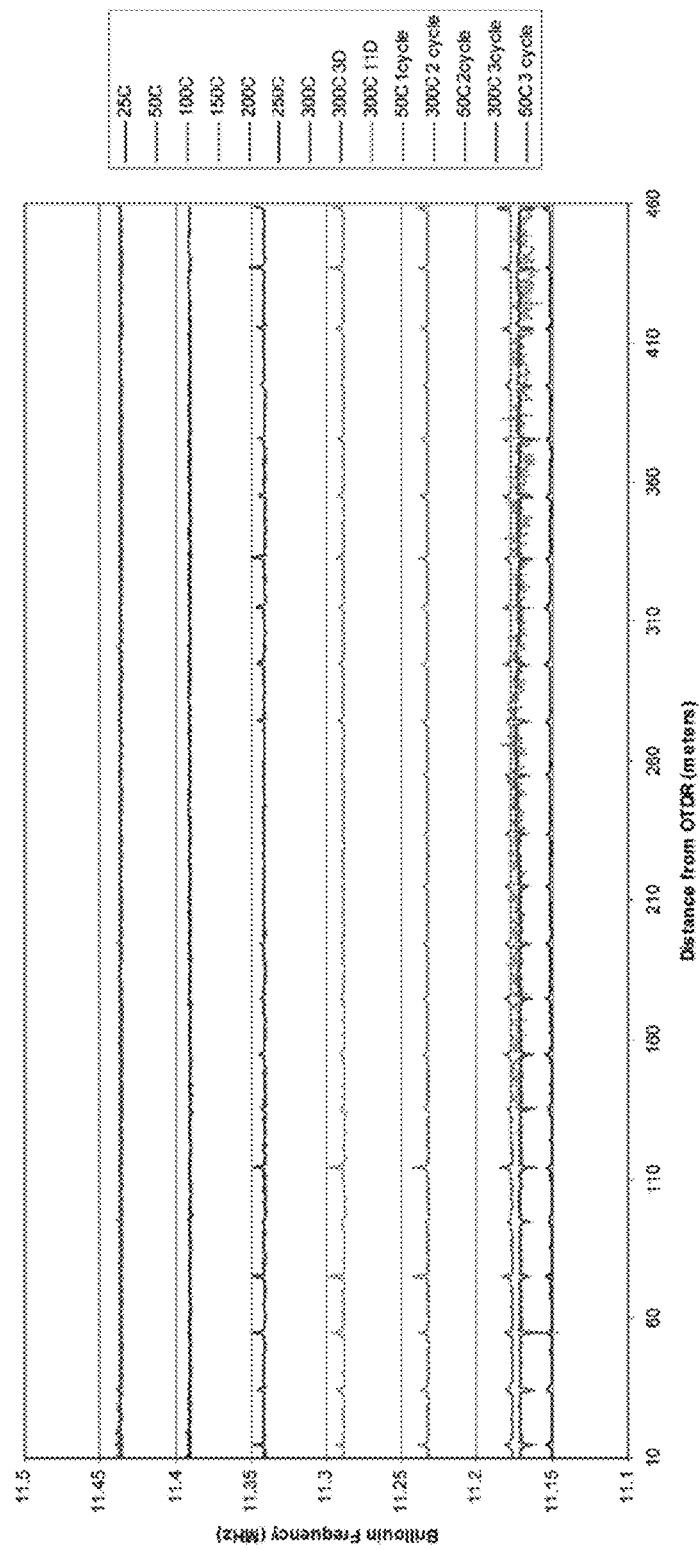
FIG. 7 depicts BOTDA results for a hydrogen-insensitive single-mode optical fiber in the third exemplary optical-fiber buffer tube.

FIG. 7 depicts BOTDA results for the hydrogen-insensitive single-mode optical fiber contained in Sample III. Each peak represents an increased Brillouin frequency due to strain and corresponds to the location of a discrete deposit of adhesive. As depicted in FIG. 7, these peaks disappear as temperature increases. This indicates that the adhesive softens at higher temperatures, presumably reducing strain on the fiber.

Figure 8:
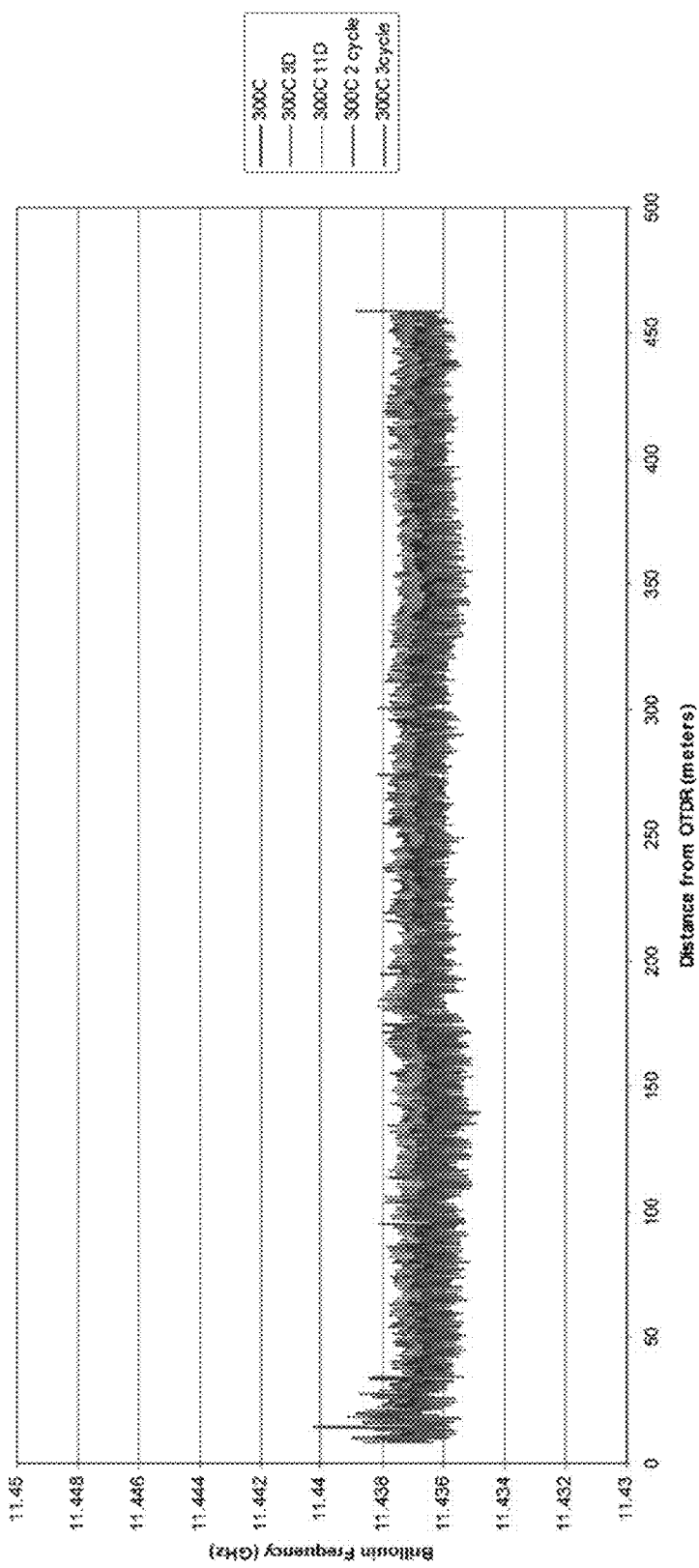
FIG. 8 depicts BOTDA results for the hydrogen-insensitive single-mode optical fiber in the third exemplary optical-fiber buffer tube.

FIG. 8 depicts BOTDA results for the hydrogen-insensitive single-mode optical fiber in Sample III after soaking at 300° C. and cycling to 300° C.

After testing was completed, the discrete deposits of adhesive were inspected. The discrete deposits of adhesive in Sample II demonstrated serious degradation. In particular, the discrete deposits of adhesive in Sample II changed from a soft, rubbery material to a hard, brittle material. In contrast, the discrete deposits of adhesive in Sample III remained soft and rubbery with no visible signs of degradation.

The optical fibers positioned within the present optical-fiber buffer tubes and optical-fiber cables may be used for various functions.

In one embodiment, one or more of the optical fibers may be used for telecommunications or may provide a data-communications link.

In another embodiment, one or more of the optical fibers may be employed as sensors. For example, one or more of the optical fibers may facilitate distributed sensing, such as distributed temperature sensing (DTS) or distributed acoustical sensing (DAS).

In yet another embodiment, an optical fiber may be employed as a signal carrier connected to a discrete (e.g., single point) optical sensor. For example, an optical fiber may employ Fiber Bragg Grating (FBG). As will be known by those having ordinary skill in the art, FBG is a periodic or aperiodic variation in the refractive index of an optical-fiber core and/or cladding. This variation in the refractive index results in a range of wavelengths (e.g., a narrow range) being reflected rather than transmitted, with maximum reflectivity occurring at the Bragg wavelength.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Because the present buffer tubes and optical-fiber cables can withstand high temperatures (e.g., 300° C. and higher), they are particularly suitable for deployments in wells, such as geothermal wells, gas wells, and oil wells (e.g., "downhole" applications).

The present buffer tubes and optical-fiber cables can be used in other industrial applications, particularly where the ability to withstand extreme temperatures is important. For example, the present buffer tubes and optical-fiber cables can be employed in pipelines to facilitate distributed temperature sensing (e.g., to detect leaks). The pipelines can be deployed in above-ground structures or buried directly into the ground. For example, process pipelines in chemical or petroleum refining plants can transport materials exceeding 200° C.

The present buffer tubes and optical-fiber cables can be used for process equipment monitoring (e.g., using DTS) in industrial settings, such as in refractory vessels in oil refineries. Refractory vessels must be kept at temperatures of at least 300° C. (e.g., 350° C. or higher).

The present buffer tubes and optical-fiber cables may be employed for data transmission (e.g., for process control and alarm systems) closer to high-temperature processes and equipment. Accordingly, the present buffer tubes and optical-fiber cables may be employed in metal-processing plants, such as steel mills. The present buffer tubes and optical-fiber cables may be positioned in close proximity to engines and turbines, which can reach elevated temperatures.

The present buffer tubes and optical-fiber cables may also be employed in low-temperature environments (e.g., in liquefied natural gas pipelines). Liquefied natural gas (LNG) is typically treated, transported, and stored at about −162° C.

As will be known to those having ordinary skill in the art, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the fiber core, while the higher order modes (e.g., the LP11 mode) are strongly attenuated.

Multimode optical fibers are commonly used for short-distance applications requiring a broad bandwidth, such as local networks or LAN (local area network). Multimode optical fibers have been the subject of international standardization by the ITU (International Telecommunication Union) under the ITU-T G.651.1 recommendations, which, in particular, define criteria (e.g., bandwidth, numerical aperture, and core diameter) that relate to the requirements for optical fiber compatibility. The ITU-T G.651.1 recommendations (July 2007) are hereby incorporated by reference in their entirety.

Single-mode optical fibers are commonly used in transmission systems. To facilitate compatibility between optical systems from different manufacturers, the International Telecommunication Union (ITU) has defined a standard reference ITU-T G.652 with which a standard optical transmission fiber (i.e., a standard single-mode fiber or SSMF) should comply. The ITU-T G.652 recommendations (November 2009) and each of its attributes (i.e., A, B, C, and D) are hereby incorporated by reference in their entirety.

The ITU (International Telecommunication Union) has also defined standards relating to bend-insensitive optical fibers, in particular the ITU-T G.657.A standards (e.g., the ITU-T G.657.A1 (November 2009) and the ITU-T G.657.A2 (November 2009) subcategories) and ITU-T G.657.B standards (e.g., the ITU-T G.657.B2 (November 2009) and the ITU-T G.657.B3 (November 2009) subcategories). The ITU-T G.657.A recommendations impose bending loss limits but seek above all to maintain compatibility with the ITU-T G.652 recommendations (e.g., the ITU-T G.652.D recommendations), particularly with respect to mode field diameter and chromatic dispersion. In contrast, the ITU-T G.657.B recommendations do not impose compatibility with ITU-T G.652 recommendations but impose stricter limits on bending losses than those imposed by the ITU-T G.657.A1 recommendations. The ITU-T G.657.A recommendations, namely the ITU-T G.657.A1 (November 2009) and the ITU-T G.657.A2 (November 2009) subcategories, and the ITU-T G.657.B recommendations, namely the ITU-T G.657.B2 (November 2009) and the ITU-T G.657.B3 (November 2009) subcategories, are hereby incorporated by reference in their entirety.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber (Overton); U.S. Pat. No. 8,265,442 for a Microbend-Resistant Optical Fiber (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber (de Montmorillon et al.); U.S. Patent Application Publication No. US2010/0021170 A1 for a Wavelength Multiplexed Optical System with Multimode Optical Fibers (Lumineau et al.); U.S. Pat. No. 7,995,888 for a Multimode Optical Fibers (Gholami et al.); U.S. Patent Application Publication No. US2010/0119202 A1 for a Reduced-Diameter Optical Fiber (Overton); U.S. Patent Application Publication No. US2010/0142969 A1 for a Multimode Optical System (Gholami et al.); U.S. Pat. No. 8,259,389 for an Amplifying Optical Fiber and Method of Manufacturing (Pastouret et al.); U.S. Patent Application Publication No. US2010/0135627 A1 for an Amplifying Optical Fiber and Production Method (Pastouret et al.); U.S. Patent Application Publication No. US2010/0142033 for an Ionizing Radiation-Resistant Optical Fiber Amplifier (Regnier et al.); U.S. Pat. No. 8,274,647 for a Method of Classifying a Graded-Index Multimode Optical Fiber (Gholami et al.); U.S. Patent Application Publication No. US2010/0189397 A1 for a Single-Mode Optical Fiber (Richard et al.); U.S. Pat. No. 8,290,324 for a Single-Mode Optical Fiber Having an Enlarged Effective Area (Sillard et al.); U.S. Pat. No. 8,301,000 for a Single-Mode Optical Fiber (Sillard et al.); U.S. Patent Application Publication No. US2010/0214649 A1 for an Optical Fiber Amplifier Having Nanostructures (Burow et al.); U.S. Pat. No. 8,009,950 for a Multimode Fiber (Molin et al.); U.S. Patent Application Publication No. US2010/0310218 A1 for a Large Bandwidth Multimode Optical Fiber Having a Reduced Cladding Effect (Molin et al.); U.S. Patent Application Publication No. US2011/0058781 A1 for a Multimode Optical Fiber Having Improved Bending Losses (Molin et al.); U.S. Pat. No. 8,340,488 for a Multimode Optical Fiber (Molin et al.); U.S. Patent Application Publication No. US2011/0069724 A1 for an Optical Fiber for Sum-Frequency Generation (Richard et al.); U.S. Patent Application Publication No. US2011/0116160 A1 for a Rare-Earth-Doped Optical Fiber Having Small Numerical Aperture (Boivin et al.); U.S. Pat. No. 8,280,213 for a High-Bandwidth, Multimode Optical Fiber with Reduced Cladding Effect (Molin et al.); U.S. Patent Application Publication No. US2011/0123162 A1 for a High-Bandwidth, Dual-Trench-Assisted Multimode Optical Fiber (Molin et al.); U.S. Patent Application Publication No. US2011/0135262 A1 for a Multimode Optical Fiber with Low Bending Losses and Reduced Cladding Effect (Molin et al.); U.S. Patent Application Publication No. US2011/0135263 A1 for a High-Bandwidth Multimode Optical Fiber Having Reduced Bending Losses (Molin et al.); U.S. Patent Application Publication No. US2011/0188826 A1 for a Non-Zero Dispersion Shifted Optical Fiber Having a Large Effective Area (Sillard et al.); U.S. Patent Application Publication No. US2011/0188823 A1 for a Non-Zero Dispersion Shifted Optical Fiber Having a Short Cutoff Wavelength (Sillard et al.); U.S. Patent Application Publication No. 2011/0217012 A1 for a Broad-Bandwidth Multimode Optical Fiber Having Reduced Bending Losses (Bigot-Astruc et al.); U.S. Patent Application Publication No. 2011/0229101 A1 for a Single-Mode Optical Fiber (de Montmorillon et al.); U.S. Patent Application Publication No. 2012/0051703 A1 for a Single-Mode Optical Fiber (Bigot-Astruc et al.); U.S. Patent Application Publication No. 2012/0040184 A1 for a Method of Fabricating an Optical Fiber Preform (de Montmorillon et al.); U.S. Patent Application Publication No. 2012/0092651 A1 for a Multimode Optical Fiber Insensitive to Bending Losses (Molin et al.); U.S. Patent Application Publication No. 2012/0134376 A1 for a Radiation-Insensitive Optical Fiber Doped with Rare Earths (Burow et al.); U.S. Patent Application Publication No. 2012/0148206 A1 for a Rare-Earth-Doped Optical Fiber (Boivin et al.); U.S. Patent Application Publication No. 2012/0195549 A1 for a Broad-Bandwidth Optical Fiber (Molin et al.); U.S. Patent Application Publication No. 2012/0195561 A1 for a Multimode Optical Fiber (Molin et al.); U.S. Patent Application Publication No. 2012/0224254 A1 for a Rare-Earth-Doped Amplifying Optical Fiber (Burov et al.); U.S. Patent Application Publication No. 2012/0243843 A1 for a Bend-Resistant Multimode Optical Fiber, (Molin et al.); U.S. Patent Application Publication No. 2012/0251062 A1 for a Multimode Optical Fiber, (Molin et al.); U.S. Patent Application Publication No. 2012/0275751 A1 for a High-Bandwidth, Radiation-Resistant Multimode Optical Fiber, (Krabshuis et al.); U.S. Patent Application Publication No. 2012/0301093 A1 for a Single-Mode Optical Fiber, (Sillard et al.); U.S. Patent Application Publication No. 2012/0315006 A1 for a Single-Mode Optical Fiber, (Sillard et al.) U.S. Patent Application Publication No. 2013/0004135 for a Multimode Optical Fiber, (Bigot-Astruc et al.); U.S. Patent Application Publication No. 2013/0028564 A1 for a Trench-Assisted Multimode Optical Fiber, (Molin); U.S. patent application Ser. No. 13/657,251 for an Hydrogen-Sensing Optical Fiber, filed Oct. 22, 2012, (Burov et al.); and U.S. patent application Ser. No. 13/683,555 for a PCVD Method and Apparatus, filed Nov. 21, 2012, (Milicevic et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S.

Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels (Lookadoo et al.); U.S. Patent Application Publication No. US2009/0297107 A1 for an Optical Fiber Telecommunication Cable (Tatat); U.S. Pat. No. 8,195,018 for a Buffer Tube with Adhesively Coupled Optical Fibers and/or Water-Swellable Element; U.S. Patent Application Publication No. US2010/0092135 A1 for an Optical Fiber Cable Assembly (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical-Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Pat. No. 8,346,040 for a Buffered Optical Fiber (Testu et al.); U.S. Patent Application Publication No. US2010/0154479 A1 for a Method and Device for Manufacturing an Optical Preform (Milicevic et al.); U.S. Patent Application Publication No. US2010/0166375 for a Perforated Water-Blocking Element (Parris); U.S. Pat. No. 8,314,408 for a UVLED Apparatus for Curing Glass-Fiber Coatings (Hartsuiker et al.); U.S. Patent Application Publication No. US2010/0202741 A1 for a Central-Tube Cable with High-Conductivity Conductors Encapsulated with High-Dielectric-Strength Insulation (Ryan et al.); U.S. Patent Application Publication No. US2010/0215328 A1 for a Cable Having Lubricated, Extractable Elements (Tatat et al.); U.S. Patent Application Publication No. US2011/0026889 A1 for a Tight-Buffered Optical Fiber Unit Having Improved Accessibility (Risch et al.); U.S. Pat. No. 8,306,380 for Methods and Devices for Cable Insertion into Latched Conduit (Leatherman et al.); U.S. Patent Application Publication No. 2011/0069932 A1 for a High-Fiber-Density Optical-Fiber Cable (Overton et al.); U.S. Patent Application Publication No. 2011/0091171 A1 for an Optical-Fiber Cable Having High Fiber Count and High Fiber Density (Tatat et al.); U.S. Patent Application Publication No. 2011/0176782 A1 for a Water-Soluble Water-Blocking Element (Parris); U.S. Patent Application Publication No. 2011/0268400 A1 for a Data-Center Cable (Louie et al.); U.S. Patent Application Publication No. 2011/0268398 A1 for a Bundled Fiber Optic Cables (Quinn et al.); U.S. Patent Application Publication No. 2011/0287195 A1 for a Curing Apparatus Employing Angled UVLEDs (Molin); U.S. Patent Application Publication No. 2012/0009358 for a Curing Apparatus Having UV Sources That Emit Differing Ranges of UV Radiation (Gharbi et al.); U.S. Patent Application Publication No. 2012/0014652 A1 for a Adhesively Coupled Optical Fibers and Enclosing Tape (Parris); U.S. Patent Application Publication No. 2012/0040105 A1 for a Method and Apparatus Providing Increased UVLED Intensity (Overton); U.S. Patent Application Publication No. 2012/0057833 A1 for an Optical-Fiber Module Having Improved Accessibility (Tatat); and U.S. Patent Application Publication No. 2012/0213483 A1 for a Optical-Fiber Interconnect Cable (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber buffer tube, comprising:
   an optical fiber capable of operating at temperatures of at least about 200° C.;
   a protective tube surrounding said optical fiber, said protective tube being capable of operating at temperatures of at least about 200° C.; and
   a plurality of discrete deposits of adhesive material coupling said optical fiber to said protective tube, said adhesive material being capable of operating at temperatures of at least about 200° C.;
   wherein the buffer tube has a buffer-tube adhesive filling coefficient of less than about 0.01.

2. The optical-fiber buffer tube according to claim 1, wherein said optical fiber comprises a polyimide coating.

3. The optical-fiber buffer tube a according to claim 1, wherein said optical fiber possesses low sensitivity to hydrogen.

4. The optical-fiber buffer tube according to claim 1, wherein said protective tube comprises a nickel-chromium alloy.

5. The optical-fiber buffer tube according to claim 1, wherein said protective tube comprises a fluoropolymer.

6. The optical-fiber buffer tube according to claim 1, wherein said discrete deposits of adhesive material comprise silicone adhesive.

7. An optical-fiber cable, comprising:
   an optical-fiber buffer tube comprising (i) an optical fiber capable of operating at temperatures of at least about 200° C., (ii) a protective tube surrounding said optical fiber, said protective tube being capable of operating at temperatures of at least about 200° C., and (iii) a plurality of discrete deposits of adhesive material coupling said optical fiber to said protective tube, said adhesive material being capable of operating at temperatures of at least about 200° C., and wherein said optical-fiber buffer tube has a buffer-tube adhesive filling coefficient of less than about 0.01;
   a high-conductivity conductor;
   an outer jacket surrounding said optical-fiber buffer tube and said high-conductivity conductor; and
   a longitudinal strength member surrounding said outer jacket.

8. The optical-fiber cable according to claim 7, wherein said optical-fiber buffer tube comprises (i) an optical fiber that possesses low sensitivity to hydrogen and is capable of operating at temperatures of at least about 300° C., (ii) a protective tube surrounding said optical fiber, said protective tube being capable of operating at temperatures of at least about 300° C., and (iii) a plurality of discrete deposits of silicone adhesive coupling said optical fiber to said protective tube, said silicone adhesive being capable of operating at temperatures of at least about 300° C.

9. The optical-fiber cable according to claim 7, wherein said high-conductivity conductor comprises nickel-coated copper.

10. The optical-fiber cable according to claim 7, wherein said high-conductivity conductor is insulated with a fluoropolymer.

11. The optical-fiber cable according to claim 7, wherein said outer jacket comprises a nickel-chromium alloy.

12. The optical-fiber cable according to claim 7, wherein said longitudinal strength member comprises a nickel-chromium alloy and/or stainless steel.

13. The optical-fiber cable according to claim 7, wherein said longitudinal strength member comprises:
   a first layer of metal wires surrounding said outer jacket; and
   a second layer of metal wires surrounding said first layer of metal wires.

14. The optical-fiber cable according to claim 13, wherein said first layer of metal wires and said second layer of metal wires are contrahelically wrapped around said outer jacket.

15. The optical-fiber cable according to claim 7, wherein said longitudinal strength member provides outer-tube coverage of at least about 75 percent.

16. The optical-fiber cable according to claim 7, wherein said longitudinal strength member provides outer-tube coverage of about 95 percent.

17. The optical-fiber cable according to claim 7, wherein the optical-fiber cable has an actual self-supporting length of at least about 5,000 feet at an operating temperature of at least about 300° C.

18. The optical-fiber cable according to claim 7, wherein the optical-fiber cable has an actual self-supporting length of at least about 15,000 feet at an operating temperature of at least about 300° C.

19. An optical-fiber cable, comprising:
   an optical-fiber buffer tube comprising (i) an optical fiber capable of operating at temperatures of at least about 300° C., (ii) a protective tube surrounding said optical fiber, said protective tube being capable of operating at temperatures of at least about 300° C., and (iii) a plurality of discrete deposits of adhesive material coupling said optical fiber to said protective tube, said adhesive material being capable of operating at temperatures of at least about 300° C., and wherein said optical-fiber buffer tube has a buffer-tube adhesive filling coefficient of less than about 0.01;
   a high-conductivity conductor;
   an outer jacket surrounding said optical-fiber buffer tube and said high-conductivity conductor; and
   a longitudinal strength member surrounding said outer jacket and providing outer-tube coverage of at least about 75 percent;
   wherein the optical-fiber cable has an actual self-supporting length of at least about 10,000 feet at an operating temperature of at least about 300° C.

20. The optical-fiber cable according to claim 19, wherein said longitudinal strength member comprises:
   a first layer of metal wires surrounding said outer jacket; and
   a second layer of metal wires surrounding said first layer of metal wires;
   wherein said first layer of metal wires and said second layer of metal wires are contrahelically wrapped around said outer jacket.

* * * * *